United States Patent
Ikejiri et al.

(10) Patent No.: US 11,746,447 B2
(45) Date of Patent: Sep. 5, 2023

(54) GLASS CLOTH, PREPREG, AND GLASS FIBER-REINFORCED RESIN MOLDED PRODUCT

(71) Applicant: NITTO BOSEKI CO., LTD., Fukushima (JP)

(72) Inventors: Hirotaka Ikejiri, Fukushima (JP); Masahiro Awano, Fukushima (JP); Kimihiro Takatsu, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 17/599,133

(22) PCT Filed: Aug. 20, 2020

(86) PCT No.: PCT/JP2020/031449
§ 371 (c)(1),
(2) Date: Sep. 28, 2021

(87) PCT Pub. No.: WO2021/039582
PCT Pub. Date: Mar. 4, 2021

(65) Prior Publication Data
US 2022/0089824 A1 Mar. 24, 2022

(30) Foreign Application Priority Data
Aug. 27, 2019 (JP) .................. 2019-154708

(51) Int. Cl.
*D03D 15/267* (2021.01)
*C08J 5/24* (2006.01)
*D03D 15/46* (2021.01)
*D03D 15/37* (2021.01)
*D03D 15/41* (2021.01)

(52) U.S. Cl.
CPC ............ *D03D 15/267* (2021.01); *C08J 5/244* (2021.05); *D03D 15/37* (2021.01); *D03D 15/41* (2021.01); *D03D 15/46* (2021.01); *C08J 2363/00* (2013.01)

(58) Field of Classification Search
CPC .... D03D 15/267; D03D 15/46; D03D 13/008; D03D 15/37; D03D 15/41; D03D 15/43
See application file for complete search history.

(56) References Cited

U.S. PATENT DOCUMENTS

| | | | | |
|---|---|---|---|---|
| 7,049,253 B1 * | 5/2006 | Kimura | ............... | H05K 1/0366 139/420 R |
| 10,934,640 B2 * | 3/2021 | Ikejiri | .................. | D03D 13/008 |
| 2005/0121828 A1 * | 6/2005 | Kobue | ................. | H05K 1/0366 65/437 |
| 2006/0035552 A1 * | 2/2006 | Fujimura | ............. | H05K 1/0366 442/208 |
| 2007/0290942 A1 * | 12/2007 | Morin | ................... | H01Q 1/422 428/221 |
| 2013/0210602 A1 * | 8/2013 | Nonaka | ................... | C03C 13/06 501/35 |

FOREIGN PATENT DOCUMENTS

| | | | | |
|---|---|---|---|---|
| CN | 107709642 A | * | 2/2018 | ............... C08J 5/24 |
| CN | 107709642 A | | 2/2018 | |
| JP | 2003-253545 A | | 9/2003 | |
| JP | 2010-262143 A | | 11/2010 | |
| JP | 2012-001855 A | | 1/2012 | |
| WO | 00/60153 A1 | | 10/2000 | |
| WO | WO-2012101991 A1 | * | 8/2012 | ............. B32B 15/14 |

* cited by examiner

*Primary Examiner* — Jennifer A Steele
(74) *Attorney, Agent, or Firm* — Carrier Shende & Associates, P.C.; Joseph P. Carrier; Fulchand P. Shende

(57) ABSTRACT

A glass cloth including warp yarns and weft yarns that are glass yarns each formed by bundling 30 to 44 glass filaments each having a circle-equivalent diameter of 3.0 to 4.4 μm, wherein the weaving density of the warp yarns and the weft yarns is 85 to 125 yarns/25 mm, at least either of the warp yarn and the weft yarn is a flat glass yarn formed of flat glass filaments, the weaving density thereof is less than 100 yarns/25 mm, the major axis DL of the flat glass filament is 3.3 to 6.0 μm, the minor axis DS is 2.0 to 3.9 μm, the number of twists T of each of the flat glass yarns is 0.70 twists/25 mm or less, and the number of the flat glass filaments F constituting each of the flat glass yarns, T, DL, and DS satisfy the following expression:

$$89.0 \le F \times (DL \times (1 - T^{1/2}) + DS \times T^{1/2})/(DL/DS) \le 129.0.$$

4 Claims, No Drawings

GLASS CLOTH, PREPREG, AND GLASS FIBER-REINFORCED RESIN MOLDED PRODUCT

TECHNICAL FIELD

The present invention relates to a glass cloth, a prepreg including the glass cloth, and a glass fiber-reinforced resin molded product including the glass cloth.

BACKGROUND ALT

Conventionally, as insulating material in printed wiring boards, prepregs obtained by impregnating a glass cloth with a resin such as epoxy resin have been used. The glass cloth comprises warp yarns and weft yarns each formed by bundling a plurality of glass filaments.

Recently, for the purpose of further downsizing, thickness reduction, and function enhancement of electronic devices, thickness reduction of the printed wiring boards and the prepregs has been further required, and thickness reduction and weight reduction of a glass cloth also have been more required. In response to these demands, the amount of resin used in the prepregs has been reduced. With reduction in the amount of resin, when a prepreg is formed by impregnating the glass cloth with a resin, pinholes are more likely to be generated. Thus, there is known a glass cloth that has a weaving density equivalent to or more than 100 yarns/25 mm and a thickness of in the range of 6.5 to 11.0 μm and in which generation of pinholes in the glass cloth is inhibited (e.g., see Patent Literature 1).

CITATION LIST

Patent Literature

Patent Literature 1: Japanese Patent No. 6536764

SUMMARY OF INVENTION

Technical Problem

However, with the glass cloth described in Patent Literature 1, which has a weaving density equivalent to or more than 100 yarns/25 mm, sufficient weight reduction and thickness reduction cannot be achieved. Further, due to many glass yarns to be used, preparations for the warping step of aligning warp yarns and operations for preparing warp yarns on the loom in the weaving step during production are time-consuming, operations such as preparation of weft yarns during weaving increase, and furthermore, a weaving time per unit length is prolonged. Thus, there are disadvantages such as unfavorable workability and production efficiency.

It is an object of the present invention to overcome such disadvantages and provide a glass cloth capable of achieving sufficient weight reduction, capable of improving workability and production efficiency, and capable of inhibiting generation of pinholes in a prepreg including the glass cloth even when thickness reduction to less than 10 μm is achieved by setting the weaving density to less than 100 yarns/25 mm.

It is another object of the present invention to provide a prepreg including the glass cloth and a glass fiber-reinforced resin molded product including the glass cloth.

Solution to Problem

In order to achieve the objects, the glass cloth of the present invention comprises warp yarns and weft yarns that are glass yarns each formed by bundling glass filaments in the range of 30 to 44 filaments each having a circle-equivalent diameter in the range of 3.0 to 4.4 μm. The weaving density of the warp yarns and the weaving density of the weft yarns are each in the range of 85 to 125 yarns/25 mm. At least either of the warp yarn and the weft yarn is a flat glass yarn composed of flat glass filaments each having a flat cross-sectional shape, and the weaving density thereof is less than 100 yarns/25 mm. The major axis DL of the flat cross section of each of the flat glass filaments is in the range of 3.3 to 6.0 μm, the minor axis DS of the flat cross section of each of the flat glass filaments is in the range of 2.0 to 3.9 μm, and the major axis DL is a higher value than the minor axis DS. The number of twists T of each of the flat glass yarns is equivalent to or less than 0.70 twists/25 mm. The number of the flat glass filaments F constituting each of the flat glass yarns, the number of twists T, the major axis DL, and the minor axis DS satisfy the following expression (1):

$$89.0 \leq F \times (DL \times (1 - T^{1/2}) + DS \times T^{1/2})/(DL/DS) \leq 129.0 \quad (1)$$

In the glass cloth of the present invention, the warp yarns and the weft yarns are each required to be formed by bundling glass filaments in the range of 30 to 44 filaments each having a circle-equivalent diameter in the range of 3.0 to 4.4 μm. Here, the circle-equivalent diameter means a fiber diameter when the cross-sectional area of the glass filament is converted to a perfect circle.

When the circle-equivalent diameter of the glass filament constituting the warp yarn or the weft yarn exceeds 4.4 μm or the number of the glass filaments exceeds 44, it is not possible to sufficiently reduce the weight of the glass cloth. When the circle-equivalent diameter of the glass filament is less than 3.0 μm, the production efficiency decreases due to prevention of occurrence of yarn breakage or fuzz. When the number of the glass filaments is less than 30, it is difficult to inhibit generation of pinholes in a prepreg including the glass cloth.

When the warp yarns and the weft yarns are used in the glass cloth of the present invention, the weaving density of the warp yarns and the weaving density of the weft yarns are each required to be in the range of 85 to 125 yarns/25 mm. If the weaving density of the warp yarn or the weft yarn exceeds 125 yarns/25 mm, it is not possible to sufficiently reduce the weight of the glass cloth, and it is difficult to efficiently produce the glass cloth. In contrast, when the weaving density of the warp yarn or the weft yarn is less than 85 yarns/25 mm, it is difficult to inhibit generation of pinholes in a prepreg including the glass cloth.

In the glass cloth of the present invention, at least either of the warp yarn and the weft yarn is a flat glass yarn composed of flat glass filaments each having a flat cross-sectional shape, and the weaving density thereof is required to be less than 100 yarns/25 mm.

In the glass cloth of the present invention, it is required that the major axis DL of the flat cross section of each of the flat glass filaments be in the range of 3.3 to 6.0 μm, the minor axis DS of the flat cross section of each of the flat glass filaments be in the range of 2.0 to 3.9 μm, the major axis DL be a higher value than the minor axis DS, and the number of twists T of each of the flat glass yarn; be equivalent to or less than 0.70 twists/25 mm. If the major axis DL exceeds 6.0 μm, it is not possible to sufficiently reduce the weight of the glass cloth. If the major axis DL is less than 3.3 μm, it is difficult to inhibit generation of pinholes. If the minor axis DS exceeds 3.9 μm, it is not possible to sufficiently reduce the thickness of the glass cloth. It is technically difficult to cause the minor axis DS to be less than 2.0 μm. If the number of twists T exceeds 0.70 twists/25 mm, it is not possible to uniformly reduce the thickness of the glass cloth.

The major axis DL contributes to reduction in the weaving density of the glass cloth, and the minor axis DS contributes to reduction in the thickness of the glass cloth. Thus, in the case where glass yarns composed of the flat glass filament are used to produce a glass cloth, it is possible to produce a thinner glass cloth with higher production efficiency, in comparison with the case where glass yarns composed of round cross-sectional glass filaments each having a circle-equivalent diameter equivalent to that of the flat glass filaments are used to produce a glass cloth. Particularly, in the case where a glass cloth having a comparable thickness is produced, production of a glass cloth using glass yarns composed of the flat glass filaments enables the production efficiency to be markedly improved.

Especially, the glass cloth of the present invention, in which the number of the flat glass filaments F constituting each of the flat glass yarns, the number of twists T, the major axis DL, and the minor axis DS satisfy the following expression (1), enables workability and production efficiency to be improved while highly reduced in weight, and further enables generation of pinholes in a prepreg including the glass cloth to be inhibited even when highly reduced in thickness to a thickness of less than 10 μm.

$$89.0 \leq F \times (DL \times (1 - T^{1/2}) + DS \times T^{1/2})/(DL/DS) \leq 129.0 \quad (1)$$

The glass cloth of the present invention, in which the number of the flat glass filaments F constituting each of the flat glass yarns, the number of twists T, the major axis DL, and the minor axis DS preferably satisfy the following expression (2), enables generation of pinholes in a prepreg including the glass cloth to be reliably inhibited even when further reduced in thickness.

$$97.0 \leq F \times (DL \times (1 - T^{1/2}) + DS \times T^{1/2})/(DL/DS) \leq 122.5 \quad (2)$$

The prepreg of the present invention includes the glass cloth of the present invention comprising the configuration described above. The prepreg of the present invention includes the glass cloth of the present invention comprising the configuration described above, thus enables generation of pinholes to be inhibit, and also can be highly reduced in thickness and highly reduced in weight.

The glass fiber-reinforced resin molded product of the present invention includes the glass cloth of the present invention comprising the configuration described above. The glass fiber-reinforced resin molded product of the present invention includes the glass cloth of the present invention comprising the configuration described above, and thus can be highly reduced in thickness and highly reduced in weight.

DESCRIPTION OF EMBODIMENT

Hereinafter, embodiments of e present invention will be described in detail.

A glass cloth of the present embodiment is composed of warp yarns and weft yarns. The warp yarn and the weft yarn are each formed by bundling glass filaments in the range of 30 to 44 filaments, preferably in the range of 34 to 42 filaments. The glass filament comprises a circle-equivalent diameter (hereinafter, also may be described as filament diameter) in the range of 3.0 to 4.4 μm, preferably in the range of 3.4 to 4.2 μm. The weaving density of the warp yarn and the weaving density of the weft yarn are each is in the range of 85 to 125 yarns/25 mm, preferably in the range of 85 to 107 yarns/25 mm.

In the glass cloth of the present embodiment, at least either of the warp yarn and the weft yarn, preferably both the warp yarn and the weft yarn are each a flat glass yarn composed of flat glass filaments each having a flat cross-sectional shape, and the weaving density is less than 100 yarns/25 mm, preferably in the range of 85 to 98 yarns/25 mm. Then, in the glass cloth of the present embodiment, the major axis DL of the flat cross section of each of the flat glass filaments is in the range of 3.3 to 6.0 μm, preferably in the range of 3.5 to 6.0 μm, more preferably in the range of 3.6 to 6.0 μm, further preferably in the range of 4.0 to 6.0 μm, particularly preferably in the range of 4.3 to 5.5 μm. The minor axis DS of the flat cross section of each of the flat glass filaments is in the range of 2.0 to 3.9 μm, preferably in the range of 2.5 to 3.5 μm. The major axis DL is a higher value than the minor axis DS. The number of twists T of each of the flat glass yarns is equivalent to or less than 0.70 twists/25 mm, preferably equivalent to or less than 0.50 twists/25 mm, more preferably equivalent to or less than 0.40 twists/25 mm, further preferably equivalent to or less than 0.20 twists/25 mm, particularly preferably equivalent to or less than 0.09 twists/25 mm. The number of the flat glass filaments F constituting each of the flat glass yarns, the number of twists T, the major axis DL, and the minor axis DS satisfy the following expression (1), preferably further satisfy the following expression (2), more preferably satisfy the following expression (3), further preferably satisfy the following expression (4).

$$89.0 \leq F \times (DL \times (1 - T^{1/2}) + DS \times T^{1/2})/(DL/DS) \leq 129.0 \quad (1)$$

$$97.0 \leq F \times (DL \times (1 - T^{1/2}) + DS \times T^{1/2})/(DL/DS) \leq 122.5 \quad (2)$$

$$97.0 \leq F \times (DL \times (1 - T^{1/2}) + DS \times T^{1/2})/(DL/DS) \leq 105.0 \quad (3)$$

$$97.5 \leq F \times (DL \times (1 - T^{1/2}) + DS \times T^{1/2})/(DL/DS) \leq 100.0 \quad (4)$$

In the glass cloth of the present embodiment, the ratio of the major axis DL of the flat cross section of each of the flat glass filaments to the minor axis DS of the flat cross section of each of the flat glass filaments (DL/DS) is, for example, in the range of 1.05 to 2.20, preferably in the range of 1.10 to 1.90, more preferably in the range of 1.25 to 1.80, further preferably in the range of 1.26 to 1.75, especially preferably in the range of 1.27 to 1.72, particularly preferably in the range of 1.50 to 1.70.

Examples of the flat cross-sectional shape possessed by each of the flat glass filaments can include a long-oval (a shape obtained by replacing each shorter side of a rectangle by a semicircle having a diameter corresponding to the shorter side), an ellipse, and a rectangle.

The glass filaments can be obtained by melting a glass batch (glass raw material) blended to have a predetermined composition, drawing the melted glass batch from nozzle tips of a bushing controlled at a predetermined temperature, and rapidly cooling the drawn product. Allowing the nozzle tips to have a protrusion, a notch, or a groove portion and controlling the melted glass temperature can provide glass filaments each having a flat cross-sectional shape. As for the composition of the glass filaments, those having a composition such as a composition for E glass fibers (glass fibers for general use), a composition for high strength glass fibers, and a composition for low dielectric constant glass fibers can be used. Herein, the composition for E glass fibers contains 52 to 56% by mass $SiO_2$, 5 to 10% by mass $B_2O_3$, 12 to 16% by mass $Al_2O_3$, 20 to 25% by mass CaO and MgO in total, and 0 to 1% by Mass $Na_2O$, $K_2O$, and $Li_2O$ in total. The composition for high strength glass fibers contains 57 to 70% by mass $SiO_2$, 18 to 30% by mass $Al_2O_3$, 0 to 13% by mass CaO, 5 to 15% by mass MgO, 0 to 1% by mass $Na_2O$, $K_2O$, and $Li_2O$ in total, 0 to 1% by mass $TiO_2$, and 0 to 2% by mass $B_2O_3$. The composition for low dielectric constant glass fibers contains 48 to 62% by mass $SiO_2$, 17 to 26% by mass $B_2O_3$, 9 to 18% by mass $Al_2O_3$, 0.1 to 9% by mass CaO, 0 to 6% by mass MgO, 0.05 to 0.5% by mass $Na_2O$, $K_2O$, and $Li_2O$ in total, 0 to 5% by mass $TiO_2$, 0 to 6% by mass SrO 0 to 3% by mass $F_2$ and $Cl_2$ total, and 0 to 6% by mass $P_2O_5$.

The glass filaments preferably have the composition for E glass fibers from the viewpoint of versatility, and preferably have the composition for high strength glass fibers from the viewpoint of preventing warping when made into a prepreg.

In this case, the composition for high strength glass fibers contains 64 to 66% by mass $SiO_2$, 24 to 26% by mass $Al_2O_3$, 9 to 11% by mass MgO, and more preferably contains 99% by mass $SiO_2$, $Al_2O_3$, and MgO in total.

The glass filaments are bundled in the range of 30 to 44 filaments by a method known per se to be formed into each of the warp yarns or the weft yarns. Obtaining glass filaments by melting a glass batch and making the melted glass batch into fibers followed by obtaining warp yarns or weft yarns by bundling a plurality of these glass filaments is referred to as spinning.

The glass cloth of the present embodiment can be obtained by weaving the warp yarns and the weft yarns with a loom known per se and performing opening treatment. Examples of the loom may include jet looms such as air jet or water jet looms, shuttle looms, and rapier looms. Examples of weaving with the loom may include plain weaving, satin weaving, mat weaving, and twill weaving.

Examples of the opening treatment may include opening by means of water flow pressure, opening by means of high-frequency vibration using a liquid as a medium, opening by means of the pressure of a fluid having a surface pressure, and opening by means of pressing with a roll. Among these opening treatments, opening by means of water flow pressure or opening by means of high-frequency vibration using a liquid as a medium is preferably used because variations in the yarn width each of the warp yarns or the weft yarns after the opening treatment are reduced. Combination of a plurality of the opening treatments can prevent occurrence of appearance defects in the glass cloth, such as bowed filling, attributable to the opening treatment.

The prepreg of the present embodiment include the glass cloth of the present embodiment described above.

The prepreg of the present embodiment can be obtained by impregnating the glass cloth described above with a resin by a method by a known method per se and semi-curing the glass cloth.

In the prepreg of the present embodiment, the resin used for impregnation of the glass cloth described above is not particularly limited. As such a resin, examples of thermosetting resins may include epoxy resins, phenol resins, unsaturated polyester resins, melamine resins, and modified polyimide resins. Examples of thermoplastic resins may include polyamide resins, polyimide resins, polybutylene terephthalate resins, polyethylene terephthalate resins, polyphenylene sulfide resins, polyphenylene ether resins, modified polyphenylene ether resins, and fluorine resins.

The glass fiber-reinforced resin molded product of the present embodiment include the above-described glass cloth of the present embodiment.

The glass fiber-reinforced resin molded product of the present embodiment can be obtained by, for example, curing the prepreg of the present embodiment. The glass fiber-reinforced resin molded product of the present embodiment also can be obtained by a method known per se such as sheet winding molding, infusion molding, and low pressure RIM forming, using the glass cloth of the present embodiment, the above-described resin, and other additives.

Applications of the glass fiber-reinforced resin molded product of the present embodiment may include printed wiring boards, housings of electronic devices, separator of fuel cells, and the like.

Examples and Comparative Examples of the present invention will be shown.

EXAMPLES

Example 1

In the present Example, first, glass filaments of a composition for E glass fibers were spun to thereby obtain warp yarns and weft yarns. Each of the warp yarns is a glass yarn having a number of twists Tt of 0.30 twists/25 mm, formed by bundling 40 flat glass filaments each having a major axis DLt of 4.2 μm, a minor axis DSt of 3.2 μm, and a circle-equivalent diameter of 3.7 μm, and each of the weft yarns is a glass yarn having a number of twists Ty of 0.30 twists/25 mm, formed by bundling 40 flat (elliptical) glass filaments each having a major axis DLy of 4.2 μm, a minor axis DSy of 3.2 μm, and a circle-equivalent diameter of 3.7 μm.

Then, weaving was performed by use of an air jet loom with the weaving density of the warp yarns set to 95 yarns/25 mm and the weaving density of the weft yarns set to 95 yarns/25 mm to obtain a plain-woven glass cloth.

The glass cloth was subjected to desizing treatment, surface treatment, and opening treatment to obtain the glass cloth of the present example.

As the desizing treatment herein, a treatment was employed including placing the glass cloth in a heating oven having an atmosphere temperature of 350° C. to 400° C. for 60 hours to thereby pyrolytically decompose a sizing agent for spinning and a sizing agent for weaving adhering to the glass cloth.

As the surface treatment, a treatment was employed including coating the glass cloth with a silane coupling agent and continuously passing the cloth through a heating oven at 130° C. to thereby cure the coupling agent.

As the opening treatment, an opening treatment using water flow pressure was employed in which a tension of 50 N was applied to the warp yarns of the glass cloth and the water flow pressure was set at 1.0 MPa.

Then, the glass cloth obtained in the present example was immersed in an epoxy resin (manufactured by DIC Corporation, product name: EPICLON1121N_80N), which was diluted with methyl ethyl ketone, to impregnate the glass cloth with the resin. After the cloth was passed through a slit of 13 μm in width to remove the excess resin, the cloth was maintained in a dryer at a temperature of 150° C. for one minute to semi-cure the glass cloth impregnated with the epoxy resin to thereby obtain a prepreg sheet sample for evaluation. The results are shown in Table 1.

In Table 1, the thickness of the glass cloth is the average value of measured values obtained when the thickness at 15 points in the glass cloth is measured in accordance with JIS R 342.0 with a micrometer.

The major axis and minor axis of the warp yarn or the weft yarn are each the average value obtained by taking the longest side that passes through the substantial center of the cross section of the glass filament constituting the warp yarn or the weft yarn as the major axis, taking the side that orthogonally intersects the major axis at the substantial center of the cross section of the glass filament as the minor axis, measuring the length of each of the major axis or the minor axis at 50 cross sections each of the warp yarns or the weft yarns with a scanning electron microscope (manufactured by Hitachi High-Technologies Corporation, product name: S-3400N, magnification: 3000×), and averaging the measurements. The number of the glass filaments constituting each of the warp yarns or weft yarns is the average value obtained by counting the number of the glass filaments of the warp yarns or the weft yarns at 50 cross sections each of the warp yarns or the weft yarns with a scanning electron microscope (manufactured by Hitachi High-Technologies Corporation, product name: S-3400N, magnification: 500×) and averaging the counted values.

The number of twists of each of the warp yarns or well yarns can be determined by calculation from the number of turns required for detwisting of a specimen and the length of the specimen before detwisting under a standard tension, by using a twist counter in accordance with JIS R 3912.

The weaving density of the warp yarn can be determined by counting the number of the warp yarns in a 25-mm area in the weft direction using a textile analyzing glass in accordance with JIS R 3420. The weaving density of the weft yarn can be determined by counting the number of the weft yarns in a 25-mm area in the warp direction using a textile analyzing glass in accordance with JIS R 3420.

The yarn width of each of the warp yarns or the weft yarns was the average value obtained by cutting three samples in a size of 60 mm×100 mm from a glass cloth, measuring the width of 30 warp yarns or weft yarns per sample with a microscope (manufactured by KEYENCE CORPORATION, product name: VHX_2000, magnification: 200×), and averaging the measured values.

As for the number of pinholes generated (pinhole number) in prepreg sheet samples for evaluation, a 200 mm×600 mm area on the surface of the prepreg sheet sample for evaluation was visually checked. The case where no pinhole was present was defined as "○" (good), and the case where pinhole(s) was (were) present was defined as "×" (unacceptable). The pinholes are observed as cavity portions not filled with the resin in the glass cloth.

A production time index is a numerical value obtained by determining a production time from the warping step of aligning warp yarns until weaving of 10,000 m of the glass cloth of the present Example and dividing the production time by a production time from the warping step of aligning warp yarns in Comparative Example 1 described below until weaving of 10,000 m of the glass cloth of Comparative Example 1. A smaller production time index means that workability and production efficiency have been improved.

Example 2

In the present Example, a glass cloth of the present example was obtained exactly in the same manner as in Example 1 except that, first, when glass filaments having the composition for E glass fibers were spun to obtain warp yarns and weft yarns, each of the warp yarns was a glass yarn that was formed by bundling 38 glass filaments each having a major axis $DL_t$ of 4.6 μm, a minor axis $DS_t$ of 2.8 μm, and a circle-equivalent diameter of 3.6 μm and that had a number of twists $T_t$ of 0.03 twists/25 mm, and each of the weft yarns was a glass yarn that was formed by bundling 38 glass filaments each having major axis $DL_y$ of 4.6 μm, a minor axis $DS_y$ of 2.8 μm, and a circle-equivalent diameter of 3.6 μm and that had a number of twists $T_y$ of 0.03 twists/25 mm.

Subsequently, a prepreg sheet sample for evaluation of the present Example was obtained exactly in the same manner as in Example 1 except that the glass cloth obtained in the present Example was employed. The results are shown in Table 1.

Example 3

In the present Example, a glass cloth of the present Example was obtained exactly in the same manner as in Example 1 except that, first, when glass filaments having the composition for E glass fibers were spun to obtain warp yarns and weft yarns, each of the warp yarns was a glass yarn that was obtained by bundling 40 glass filaments each having a major axis $DL_t$ of 3.6 μm, a minor axis $DS_t$ of 2.8 μm, and a circle-equivalent diameter of 3.2 μm and that had a number of twists $T_t$ of 030 twists/25 mm, and each of the weft yarns was a glass yarn that was obtained by bundling 40 glass filaments each having a major axis $DL_y$ of 3.6 μm, a minor axis $DS_y$ of 2.8 μm, and a circle-equivalent diameter of 3.2 μm and that had a number of twists $T_y$ of 0.30 twists/25 mm.

Subsequently, a prepreg sheet sample for evaluation of the present Example was obtained exactly in the same manner as in Example 1 except that the glass cloth obtained in the present Example was employed. The results are shown in Table 1.

Example 4

In the present Example, a glass cloth of the present Example was obtained exactly in the same manner as in Example 1 except that, first, when glass filaments having the composition for E glass fibers were spun to obtain warp yarns and weft yarns, each of the warp yarns was a glass yarn that was formed by bundling 38 glass filaments each having a major axis $DL_t$ of 3.6 μm, a minor axis $DS_t$ of 3.6 μm, and a circle-equivalent diameter of 3.6 μm and that had a number of twists $T_t$ of 0.70 twists/25 mm, the weaving density of the warp yarns was 105 yarns/25 mm, and each of the weft yarns was a glass yarn that was obtained by bundling 38 glass filaments each having a major axis $DL_y$ of 5.2 μm, a minor axis $DS_y$ of 3.3 μm, and a circle-equivalent diameter of 4.1 μm and that had a number of twists $T_y$ of 0.03 twists/25 mm.

Subsequently, a prepreg sheet sample for evaluation of the present Example was obtained exactly in the same manner as in Example 1 except that the glass cloth obtained in the present Example was employed. The results are shown in Table 1.

Example 5

In the present Example, a glass cloth of the present Example was obtained exactly in the same manner as in Example 4 except that, first, when glass filaments having the composition for E glass fibers were spun to obtain warp yarns and weft yarns, each of the weft yarns was a glass yarn that was formed by bundling 38 flat glass filaments each having a major axis DLy of 4.5 μm, a minor axis DSy of 3.5 μm, and a circle-equivalent diameter of 4.0 μm and that had a number of twists Ty of 0.03 twists/25 mm.

Subsequently, a prepreg sheet sample for evaluation of the present Example was obtained exactly in the same manner as in Example 1 except that the glass cloth obtained in the present Example was employed. The results are shown in Table 1.

Example 6

In the present Example, a glass cloth of the present example was obtained exactly in the same manner as in Example 4 except that, first, when glass filaments having the composition for E glass fibers were spun to obtain warp yarns and weft yarns, each of the weft yarns was a glass yarn that was formed by bundling 38 flat glass filaments each having a major axis DLy of 4.6 μm, a minor axis DSy of 2.8 μm, and a circle-equivalent diameter of 3.6 μm and that had a number of twists Ty of 0.03 twists/25 mm.

Subsequently, a prepreg sheet sample for evaluation of the present Example was obtained exactly in the same manner as in Example 1 except that the glass cloth obtained in the present Example was employed. The results are shown in Table 1.

Example 7

In the present Example, a glass cloth of the present Example was obtained exactly in the same manner as in Example 4 except that, first, when glass filaments having the composition for E glass fibers were spun to obtain warp yarns and weft yarns, each of the weft yarns was a glass yarn that was formed by bundling 38 flat glass filaments each having a major axis DLy of 4.6 μm, a minor axis DSy of 2.8 μm, and a circle-equivalent diameter of 3.6 μm and that had a number of twists Ty of 0.09 twists/25 mm.

Subsequently, a prepreg sheet sample for evaluation of the present Example was obtained exactly in the same manner as in Example 1 except that the glass cloth obtained in the present Example was employed. The results are shown in Table 1.

Comparative Example 11

In the present Comparative Example, a glass cloth of the present Comparative Example was obtained exactly in the same manner as in Example 4 except that, first, when glass filaments having the composition for E glass fibers were spun to obtain warp yarns and weft yarns, each of the weft yarns was a glass yarn that was formed by bundling 38 glass filament having a major axis DLy of 3.6 μm, a minor axis DSy of 3.6 μm, and a circle-equivalent diameter of 3.6 μm and that had a number of twists Ty of 0.70 twists/25 mm, and the weaving density of the weft yarns was 110 yarns/25 mm.

Subsequently, a prepreg sheet sample for evaluation of the present. Comparative Example was obtained exactly in the same manner as in Example 1 except that the glass cloth obtained in the present Comparative Example was employed. The results are shown in Table 2.

Comparative Example 2

In the present Comparative Example, a glass cloth of the present Comparative Example was obtained exactly in the same manner as in Example 4 except that, first, when glass filaments having the composition for E glass fibers were spun to obtain warp yarns and weft yarns, each of the weft yarns was a glass yarn that was formed by bundling 38 flat glass filaments each having a major axis DLy of 3.9 μm, a minor axis DSy of 3.5 μm, and a circle-equivalent diameter of 3.7 μm and that had a number of twists Ty of 0.03 twists/25 mm.

Subsequently, a prepreg sheet sample for evaluation of the present Comparative Example was obtained exactly in the same manner as in Example 1 except that the glass cloth obtained in the present Comparative Example was employed. The results are shown in Table 2.

Comparative Example 3

In the present. Comparative Example, a glass cloth of the present Comparative Example was obtained exactly in the same manner as in Example 4 except that, first, when glass filaments having the composition for E glass fibers were spun to obtain warp yarns and weft yarns, each of the weft yarns was a glass yarn that was formed by bundling 38 flat glass filaments each having a major axis DLy of 4.4 μm, a minor axis DSy of 2.2 μm, and a circle-equivalent diameter of 3.1 μm and that had a number of twists Ty of 0.03 twists/25 mm.

Subsequently, a prepreg sheet sample for evaluation of the present. Comparative Example was obtained exactly in the same manner as in Example 1 except that the glass cloth obtained in the present Comparative Example was employed. The results are shown in Table 2.

Comparative Example 4

In the present Comparative Example, a glass cloth of the present Comparative Example was obtained exactly in the same manner as in Example 4 except that, first, when glass filaments having the composition for E glass fibers were spun to obtain warp yarns and weft yarns, each of the weft yarns was a glass yarn that was formed by bundling 32 flat glass filaments each having a major axis DLy of 4.6 μm, a minor axis DSy of 2.8 μm, and a circle-equivalent diameter of 3.6 μm and that had a number of twists Ty of 0.03 twists/25 mm.

Subsequently, a prepreg sheet sample for evaluation of the present Comparative Example was obtained exactly in the same manner as in Example 1 except that the glass cloth obtained in the present Comparative Example was employed. The results are shown in Table 2.

TABLE 1

|  | Example 1 | Example 2 | Example 3 | Example 4 | Example 5 | Example 6 | Example 7 |
|---|---|---|---|---|---|---|---|
| Warp yarn major axis DLt (μm) | 4.2 | 4.6 | 3.6 | 3.6 | 3.6 | 3.6 | 3.6 |
| Warp yarn minor axis DSt (μm) | 3.2 | 2.8 | 2.8 | 3.6 | 3.6 | 3.6 | 3.6 |

TABLE 1-continued

|  | Example 1 | Example 2 | Example 3 | Example 4 | Example 5 | Example 6 | Example 7 |
|---|---|---|---|---|---|---|---|
| Warp yarn circle-equivalent diameter (μm) | 3.7 | 3.6 | 3.2 | 3.6 | 3.6 | 3.6 | 3.6 |
| Warp yarn major axis/warp yarn minor axis (DLt/DSt) | 1.31 | 1.64 | 1.29 | 1.00 | 1.00 | 1.00 | 1.00 |
| Number of filaments in warp yarn Ft (filaments) | 40 | 38 | 40 | 38 | 35 | 38 | 38 |
| Number of twists in warp yarn Tt (twists/25 mm) | 0.30 | 0.03 | 0.30 | 0.70 | 0.70 | 0.70 | 0.70 |
| Warp yarn weaving density Wt (yarns/25 mm) | 95 | 95 | 95 | 105 | 10.5 | 105 | 105 |
| Warp yarn width Bt (μm) | 136 | 140 | 140 | 136 | 132 | 136 | 132 |
| Weft yarn major axis DLy (μm) | 4.2 | 4.6 | 36 | 52 | 4.5 | 4.6 | 4.6 |
| Weft yarn minor axis DSy (μm) | 3.2 | 2.8 | 2.9 | 3.3 | 3.5 | 2.8 | 2.8 |
| Weft yarn circle-equivalent diameter (μm) | 3.7 | 3.6 | 3.2 | 4.1 | 4.0 | 3.6 | 3.6 |
| Aspect ratio (DLy/DSy) | 1.31 | 1.64 | 1.29 | 1.58 | 1.29 | 1.64 | 1.64 |
| Number of filaments in weft yarn Fy (filaments) | 40 | 38 | 40 | 38 | 38 | 38 | 38 |
| Twiss in weft yarn Ty (twists/25 mm) | 0.30 | 0.03 | 0.30 | 0.03 | 0.03 | 0.03 | 0.09 |
| Weft yarn weaving density Wy (yarns/25 mm) | 95 | 95 | 95 | 95 | 95 | 95 | 95 |
| Weft yarn width By (μm) | 200 | 195 | 200 | 210 | 200 | 195 | 190 |
| Warp yarn opening ratio = $Bt/(Ft \times (DLt + DSt)/2) \times 100$ | 91.9 | 99.6 | 109.4 | 99.4 | 96.5 | 99.4 | 96.5 |
| Weft yarn opening ratio = $By/(Fy \times (DLy + DSy)/2) \times 100$ | 135.1 | 138.7 | 156.3 | 130.0 | 131.6 | 138.7 | 135.1 |
| $Ft \times (DLt \times (1-Tt^{(1/2)}) + DSt \times Tt^{(1/2)})/(DLt/DSt)$ | 111.3 | 99.2 | 98.4 | 136.8 | 136.8 | 136.8 | 136.8 |
| $Fy \times (DLy \times (1-Ty^{(1/2)}) + DSy \times Ty^{(1/2)})/(DLy/DSy)$ | 111.3 | 99.2 | 98.4 | 117.5 | 127.9 | 99.2 | 93.9 |
| Average thickness (μm) | 9.1 | 8.5 | 8.0 | 9.5 | 9.8 | 9.3 | 9.8 |
| Production time index (based on production time of Comparative Example 1) | 0.86 | 0.88 | 0.86 | 0.87 | 0.87 | 0.87 | 0.87 |
| Pinhole number | ○ | ○ | ○ | ○ | ○ | ○ | ○ |

TABLE 2

|  | Comparative Example 1 | Comparative Example 2 | Comparative Example 3 | Comparative Example 4 |
|---|---|---|---|---|
| Warp yarn major axis DLt (μm) | 3.6 | 3.6 | 3.6 | 3.6 |
| Warp yarn minor axis DSt (μm) | 3.6 | 3.6 | 3.6 | 3.6 |
| Warn yarn circle-equivalent diameter (μm) | 3.6 | 3.6 | 3.6 | 3.6 |
| Warp yarn major axis/warp yarn minor axis (DLt/DSt) | 1.00 | 1.00 | 1.00 | 1.00 |
| Number of filaments in warp yarn Ft (filaments) | 38 | 38 | 38 | 38 |
| Number of twists in warp yarn Tt (twists/25 mm) | 0.70 | 0.70 | 0.70 | 0.70 |
| Warp yarn weaving density Wt (yarns/25 mm) | 105 | 105 | 105 | 105 |
| Warp yarn width Bt (μm) | 132 | 132 | 132 | 132 |
| Weft yarn major axis DLy (μm) | 3.6 | 3.9 | 4.4 | 4.6 |
| Weft yarn minor axis DSy (μm) | 3.6 | 3.5 | 2.2 | 2.8 |
| Weft yarn circle-equivalent diameter (μm) | 3.6 | 3.7 | 3.1 | 3.6 |
| Aspect ratio (DLy/DSy) | 1.00 | 1.11 | 2.00 | 1.64 |
| Number of filaments in weft yarn Fy (filaments) | 38 | 38 | 38 | 32 |
| Twists in weft yarn Ty (twists/25 mm) | 0.70 | 0.03 | 0.03 | 0.03 |
| Weft yarn weaving density Wy (yarns/25 mm) | 110 | 95 | 95 | 95 |
| Weft yarn width By (μm) | 185 | 190 | 175 | 155 |
| Warp yarn opening ratio = $Bt/(Ft \times (DLt + DSt)/2) \times 100$ | 96.5 | 96.5 | 96.5 | 96.5 |
| Weft yarn opening ratio = $By/(Fy \times (DLy + DSy)/2) \times 100$ | 135.2 | 135.1 | 139.6 | 130.9 |
| $Ft \times (DLt \times (1 - Tt^{(1/2)}) + DSt \times Tt^{(1/2)})/(DLt/DSt)$ | 136.8 | 136.8 | 136.8 | 136.8 |
| $Fy \times (DLy \times (1 - Ty^{(1/2)}) + DSy \times Ty^{(1/2)})/(DLy/DSy)$ | 136.8 | 130.6 | 76.4 | 83.5 |
| Average thickness (μm) | 10.0 | 10.0 | 10.0 | 9.3 |
| Production time index (based on production time of Comparative Example 1) | 1.00 | 0.87 | 0.87 | 0.87 |
| Pinhole number | ○ | x | ○ | x |

It is evident from Table 1 that, according to the glass cloths of Examples 1 to 7, even when the glass cloths were highly reduced in thickness to a thickness of less than 10 μm while workability and production efficiency were improved, there is no generation of pinholes in the prepregs including each of the glass cloths.

In contrast, from Table 2, according to the glass cloth of Comparative Example 1, in which none of the warp yarns and weft yarns is a flat glass filament, there is no generation of pinholes in the prepreg including the glass cloth, but it is not possible to reduce the thickness of the glass cloth to less than 10 μm.

According to the glass cloth of Comparative Example 2, in which, although each of the weft yarns is formed of flat glass filaments, the DL/DS value is 1.11, the aspect ratio is low, and the number of the flat glass filaments F, the number of twists T, the major axis DL, and the minor axis DS do not satisfy the expression (1), it is not possible to reduce the thickness of the glass cloth to less than 10 μm, and moreover, pinholes are generated in the prepreg including the glass cloth.

According to the glass cloth of Comparative Example 3, in which although each of the weft yarns is formed of flat glass filaments, the DL/DS value is 2.00, the aspect ratio is high, and the number of the flat glass filaments F, the number of twists T, the major axis DL, and the minor axis DS do not satisfy the expression (1), there is no generation of pinholes in the prepreg including the glass cloth, but the major axis of the flat glass filament may be located in the thickness direction, and thus it is not possible to reduce the thickness of the glass cloth to less than 10 μm.

According to the glass cloth of Comparative Example 4, in which, although each of the weft yarns is formed of flat glass filaments, the number of the flat glass filament F, the number of twists T, the major axis DL, and the minor axis DS do not satisfy the expression (1), it is possible to reduce the thickness of the glass cloth to less than 10 μm, but pinholes are generated in the prepreg including the glass cloth.

The invention claimed is:

1. A glass cloth comprising warp yarns and weft yarns that are glass yarns each formed by bundling glass filaments, wherein
   a number of the glass filaments bundled in each of the warp yarns and the weft yarns is in a range of 30 to 44 filaments, and each of the glass filaments having a circle-equivalent diameter in a range of 3.0 to 4.4 μm,
   the warp yarns and the weft yarns are flat glass yarns composed of flat glass filaments each having a flat cross-sectional shape,
   a weaving density of the flat warp yarns and weft yarns is in a range of 85 to 100 yarns/25 mm,
   a major axis DL of the flat cross section of each of the flat glass filaments is in a range of 3.3 to 6.0 μm, a minor axis DS of the flat cross section of each of the flat glass filaments is in a range of 2.0 to 3.9 μm,
   the major axis DL is a higher value than the minor axis DS,
   a ratio of the DL to the DS is in a range of 1.25 to 1.80,
   a number of twists T of each of the flat glass yarns is equivalent to or less than 0.70 twists/25 mm, and
   the number of the flat glass filaments F constituting each of the flat glass yarns, the number of twists T, the major axis DL, and the minor axis DS satisfy the following expression (1):

$$89.0 \leq F \times (DL \times (1 - T^{1/2}) + DS \times T^{1/2})/(DL/DS) \leq 129.0. \quad (1)$$

2. The glass cloth according to claim 1, wherein the number of the flat glass filaments F constituting each of the flat glass yarns, the number of twists T, the major axis DL, and the minor axis DS satisfy the following expression (2):

$$97.0 \leq F \times (DL \times (1 - T^{1/2}) + DS \times T^{1/2})/(DL/DS) \leq 122.5. \quad (2)$$

3. A prepreg comprising the glass cloth according to claim 1.

4. A glass fiber-reinforced resin molded product comprising the glass cloth according to claim 1.

* * * * *